Oct. 22, 1968 W. E. BUCK 3,407,044

APPARATUS FOR CONSERVING ENERGY IN HIGH PRESSURE CHEMICAL REACTORS

Filed Dec. 12, 1966 3 Sheets-Sheet 1

INVENTOR.

WILLARD E. BUCK

BY

Anderson, Spangler & Wymore

ATTORNEYS

INVENTOR
WILLARD E. BUCK
BY
Anderson, Spangler & Wymore
ATTORNEYS

INVENTOR
WILLARD E. BUCK
BY
Anderson, Spangler & Wymore
ATTORNEYS

United States Patent Office 3,407,044
Patented Oct. 22, 1968

3,407,044

APPARATUS FOR CONSERVING ENERGY IN HIGH PRESSURE CHEMICAL REACTORS

Willard E. Buck, Los Gatos, Calif., assignor of one-fifth to Fundamental Research Company, Berkeley, Calif., a limited partnership of California Continuation-in-part of application Ser. No. 335,916, Jan. 6, 1964. This application Dec. 12, 1966, Ser. No. 601,174
8 Claims. (Cl. 23—252)

ABSTRACT OF THE DISCLOSURE

Apparatus for utilization of energy contained in chemical reaction products at high pressure and a portion of energy derived from the expansion thereof to supply the major portion of the energy needed to pump the reactants into a high pressure reactor.

This apparatus is useful in carrying out chemical reactions requiring elevated temperatures and pressures such as Diels-Alder adduction of dienes with aromatic dienophiles as set forth in United States Patent No. 3,177,245, issued Apr. 6, 1965, and assigned to the same assignee.

This is a continuation-in-part application of my application Ser. No. 335,916, filed Jan. 6, 1964, and now abandoned.

In the recent past few years, considerable research has been conducted for the purpose of improving various commercially important chemical reactions in order to achieve a better final reaction product, both from the economical and quality viewpoints. Generally, the research has indicated that higher pressures and temperatures than ordinarily contemplated in the original reaction are the critically important aspects of most organic chemical reactions which must be strenuously controlled if improvement in the reaction is to be achieved.

Briefly, an example of the type of chemical reaction contemplated for use in the apparatus of this invention is the Diels-Alder adductions of dienes with aromatic dienophiles under exogenous pressure as set forth in the above-cited patent. As was found in that patent, the adduction rate is very greatly increased by subjecting the adduction mixtures to super-atmospheric pressures and increased temperatures.

Such use of high temperatures and pressures causes a vast shift in the aforesaid Diels-Alder adduction reaction toward the product side of the equation and, in addition, prevents undesirable side reactions. This permits the more economical use of the original starting materials. Accordingly, a higher quality final product is obtained in less time at a reduced cost.

However, a completely satisfactory apparatus for carrying out such high temperature and pressure reactions, and the method of using the same, was not known to the art until the applicant came forth with his apparatus as described hereinafter.

It is well known in the art that chemical reactions that are conducted at high temperatures and pressures, whether to insure the desired combination of the reactants or merely to reduce the reaction time, necessitate the use of bulky and costly equipment, especially where the volumes being handled are also large. The present high temperature and high pressure systems, however, possess two inherent disadvantages in addition to their expense and bulk.

The first of these is the tremendous amount of mechanical energy required to raise pressure of the reactants to the desired reaction pressure and keep them there until the reaction is complete. The other, and perhaps even more formidable problem, is returning the reaction products to ambient pressure. An ordinary throttling arrangement is likely to result in so much erosion of the components that it becomes most impractical.

To minimize the above problems, the present invention contemplates utilization of the energy contained in the reaction products at high pressure and a portion of the energy derived from expansion thereof to supply the major portion of the energy needed to pump the reactants into the high pressure reactor. The energy required to pump fluids such as those of the Diels-Alder adduction into the reaction chamber can be divided into three classes. The first of these is the energy absorbed in the reaction. This energy manifests itself in a denser product and is proportional to the change in the density or volume of the raw materials as they are converted into the reacted product times the pressure in the reactor. This part of the energy cannot be recovered and must be supplied to the pumping system. The second is the energy absorbed due to the compressibility of the reactants. At very high pressures, this may be as high as 20% of volume, even though the initial materials are liquid. The portion of this energy that can be recovered when the reaction products expand as the pressure is released depends on the number of pumping stages involved. In a single-stage pump, for example, the energy that can be recovered will not be more than 50%. Finally, the energy required to pump the volume of the reactants into the high pressure reactor is the largest part of the total energy required, and a very large precentage of this energy can be conserved by the pumping system forming the subject matter of the instant invention.

The present system is designed so that only a fraction of the total energy required by a straight-through system having the same capacity and operating pressure is needed. This is accomplished by using a small pump to supply the compression, reaction and friction losses and using a volumetric exchange piston to move the reactants into the high-pressure reactor. This exchange system conserves a large percentage of the energy that would otherwise be wasted in the act of returning the reacted components to normal pressure and temperature.

The operating pressure is very high, but the system is designed so that all valves are operated at or near zero pressure differential. This is true also of the main volumetric exchange cylinder. It operates at a small pressure differential across the piston.

The apparatus of the present invention may be used for carrying out Diels-Alder type reactions of a diene and an olefinic bond generally and is particularly suited for carrying out any number of chemical reactions where the reaction products occupy a lesser volume than the starting reactants. The present invention is particularly advantageous in carrying out, in an efficient manner, such reactions which tend to go to completion at a very, very slow rate under normal conditions of temperature and pressure.

It is, therefore, the principal object of the present invention to provide a method and apparatus for carrying out chemical reactions continuously at elevated temperatures and pressures which reduce the energy requirements to a fraction of that ordinarily needed.

Another object is the provision of a system of the type aforementioned that operates at high pressures but low differential pressures, thus simplifying the design of the various components and reducing the cost thereof.

Still another objective is to provide efficient means for returning the reaction products to ambient conditions while eliminating the erosion problems ordinarily inherent in a throttling step.

An additional object is to provide a system of the type aforementioned that operates continuously and automatically in a wide variety of chemical processes that require high pressures and elevated temperatures.

A further object of the invention is the provision of a reactor pump that is simple, efficient, safe, versatile, compact, inexpensive and adaptable for use with existing components.

Other objects will be in part apparent and in part pointed out specifically hereinafter in connection with the description of the drawings that follows, and in which.

Figure 1:
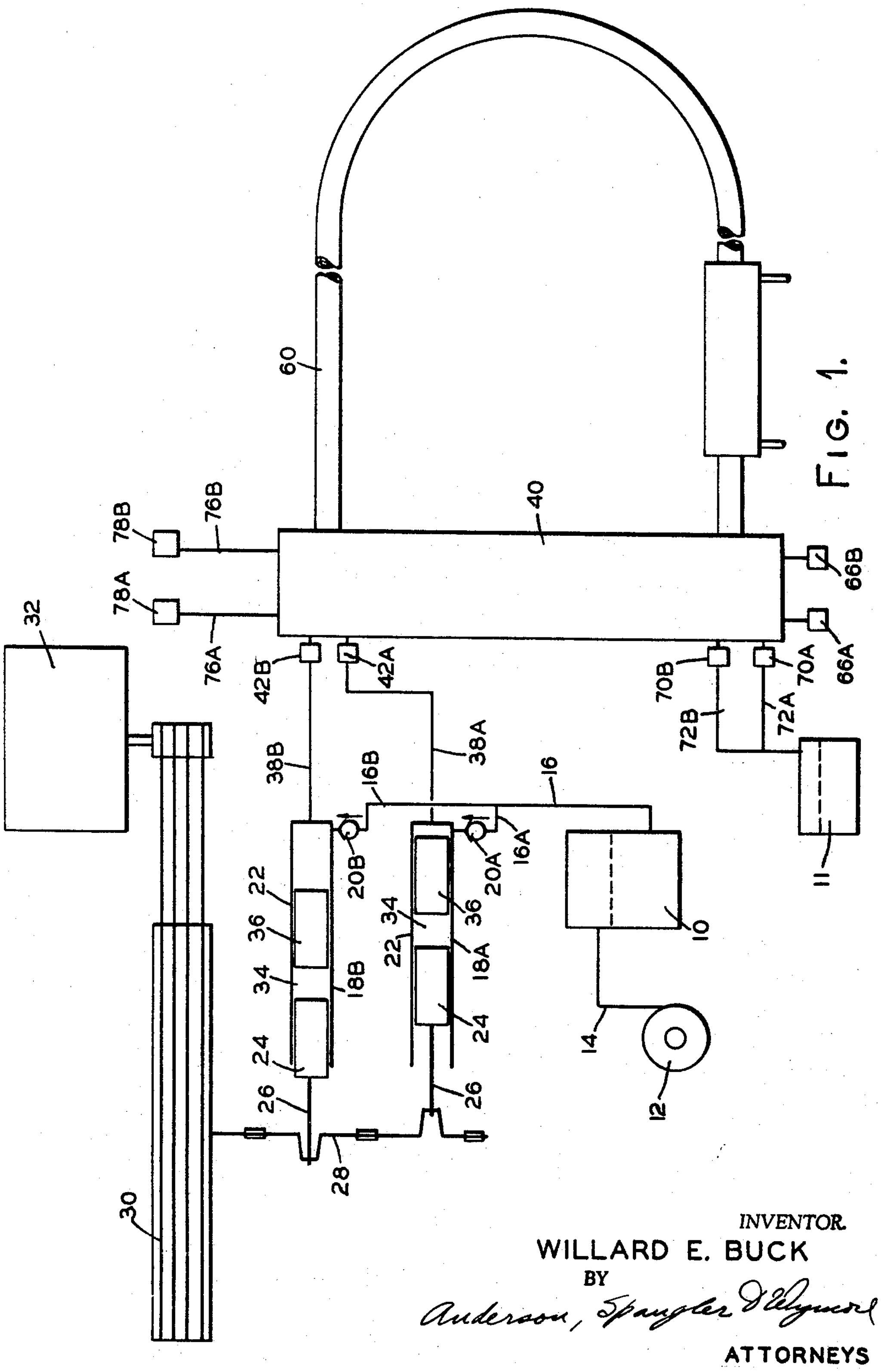
FIGURE 1 is a schematic view showing the various components of the system, including the various valves, pumps and storage reservoirs in relation to the reaction chamber.

Referring now to the drawings for a detailed description of the present invnetion and, initially, to FIGURE 1 for this purpose, reference numeral 10 represents a reactant reservoir that is charged initially to a reserve pressure of 500 p.s.i. by means of a primer pump 12 that connects into said reservoir through line 14. Leading out of reservoir 10 is a reactant delivery line 16 which branches at 16A and 16B to high pressure pumps 18A and 18B through valves 20A and 20B.

Pumps 18A and 18B are identical and of the reciprocating piston type. Each includes a cylinder 22 having a piston 24 connected by piston rod 26 to crank shaft 28. The crank shaft is, in turn, connected to a flywheel 30 driven by a prime mover 32. The primary pistons 24 are preferably made from "Carboloy" and separated from the elevated temperatures and corrosive effects of the reactants by a water seal 34 and a floating separator piston 36 that are fabricated from ceramic.

Figures 2, 3, 4:
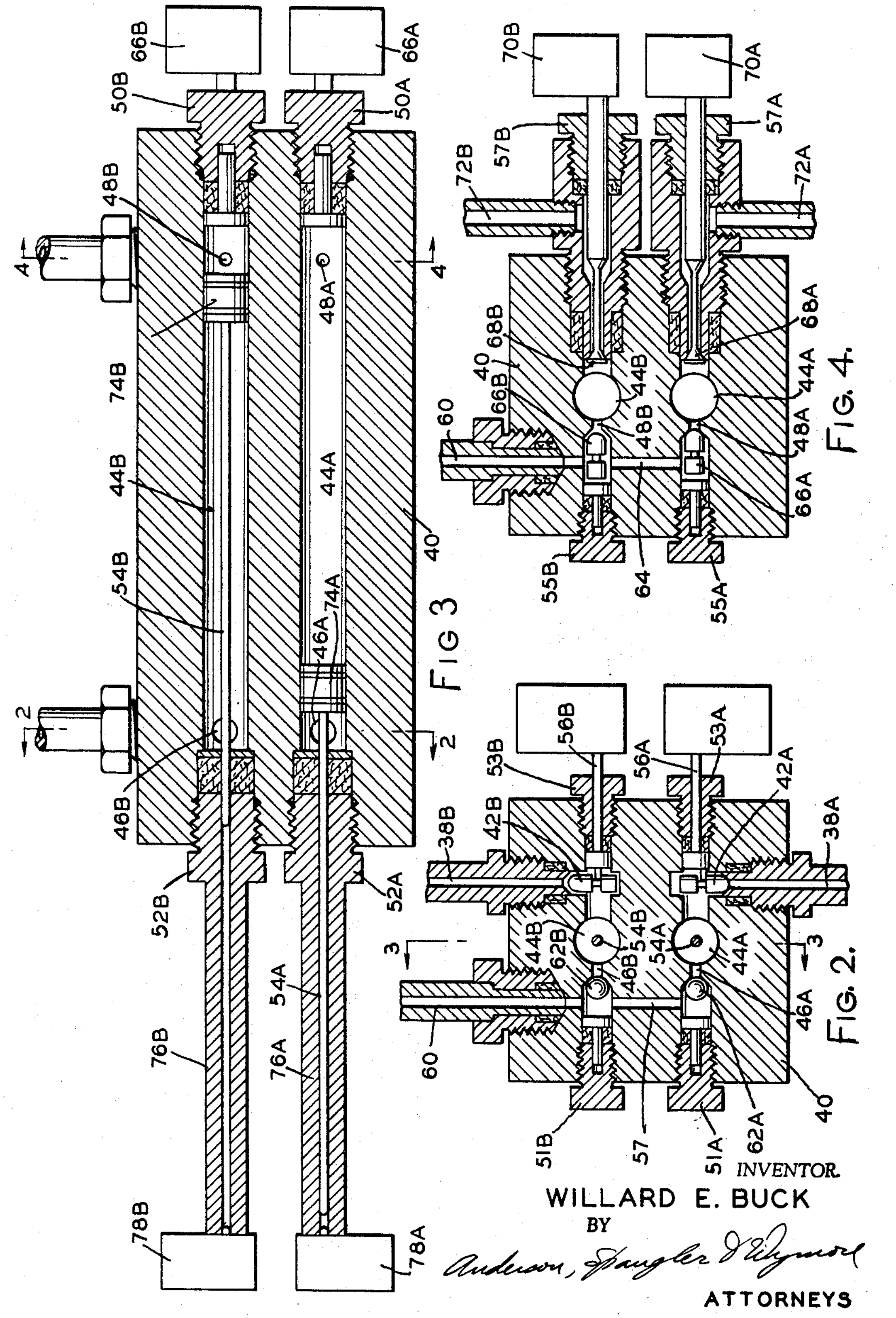
FIGURE 2 is an enlarged section taken along line 2—2 of FIGURE 3 showing the valve body and various control valves and pumps contained therein.
FIGURE 3 is a section taken along line 3—3 of FIGURE 2.
FIGURE 4 is a section taken along line 4—4 of FIGURE 3.

Leading from piston pumps 18 are high pressure reactant outlet lines 38A and 38B that connect into valve body 40 through solenoid valves 42A and 42B. The latter solenoid valves are actually housed within the volumetric pump body 40 which will now be described in detail in connection with FIGURES 2, 3 and 4.

In the particular form shown, volumetric pump body 40 comprises a block of metal that includes a pair of spaced substantially parallel longitudinal bores 44A and 44B, each of which are intersected adjacent opposite ends by transverse bores 46A, 48A, 46B and 48B, as shown. The ends of longitudinal bores 44 that lie adjacent transverse bores 48 are closed by stuffing boxes 52A and 52B within which piston rods 54A and 54B reciprocate. Thus, plug 50A cooperates with stuffing box 52A to define chamber A within longitudinal bore 44A. Similarly, stuffing box 52B and plug 51B close the ends of the bore 44B and define chamber B. The reactants enter chambers A and B through supply line 38A and 38B that intersect transverse bores 46A and B, the latter intersection containing the solenoid valves 42A and 42B which control the admission of reactants to said chambers. Supply lines 38 are obviously connected into transverse bores 46 upstream from longitudinal bores 44.

Plugs 51A and 51B are also provided in the downstream ends of transverse bores 46, the upstream ends being closed by stuffing boxes 53A and 53B that mount the actuators 56 of solenoid valves 42.

Downstream of chambers A and B, a single passage 57 interconnects transverse bores 46A and 46B and allows the reactants to pass therefrom into reactor 60 that communicates therewith. Ball check valves 62A and 62B are located in transverse bores 46A and B between chambers A and B and passage 57 to prevent the return of the reactants to the reservoir 10.

The outlet from reactor 60 communicates with a similar passage 64 that connects transverse bores 48A and 48B in the other end of the valve body ahead or upstream of chambers A and B, thus returning the reaction products to said chambers.

The flow of the reaction products back into chambers A and B from return passage 64 is controlled by a pair of solenoid valves 66A and 66B located, respectively, in transverse bores 48A and 48B. The ends of these transverse bores adjacent the solenoid valves 66 are closed by high pressure plugs 55A and 55B as before, while the opposite ends beyond chambers A and B are closed by stuffing boxes 57A and 57B that mount the push-rods 68A and B (FIGURE 5) of still another set of solenoid valves 70A and 70B. Also communicating transverse bores 48 are product discharge conduits 72A and 72B that lead to the receiver 11 (FIGURE 1) that stores the reaction products.

The various valves and conduits above-described provide means by which incremental quantities of the reactants are alternately, but continuously, fed by the reciprocation of pistons 74A and 74B within chambers A and B into the reactor 60 before passing into the receiver 72. The pistons 74 are mounted on the ends of the piston rods 54, the latter being responsible for opening and closing the several valves of the system. Extending outward axially from the stuffing boxes 52 that seal around the piston rods 54 are piston rod housings 76A and 76B to the free ends of which are attached electrical switches 78A and 78B having actuators 80A and 80B in position to be engaged by the rods 54 when nearly fully retracted.

The operation of the reactor will now be described in connection with all the figures of the drawing. In order to prime the system, priming pump 12 is started with pairs of valves 20, 42, 66 and 70, all open until the entire system is brought up to approximately 500 p.s.i. pressure. While the system is being primed, reactants are entering both chambers A and B extending the pistons 74, filling the reactor by passing check valves 62, and flowing past valves 66 to place a small quantity of reactants in that portion of the chambers lying between the pistons and the reactor outlet. When the piston pumps 18A and 18B are started and valves 66A, 66B, 70A and 70B are closed, the reactants in both chambers and the reactor will be brought up to the operating pressure of 100,000 p.s.i. The pistons will, of course, also extend slightly and compress the small quantity of reactants trapped in chambers A and B adjacent the reactor outlet up to the operating pressure of 100,000 p.s.i.

Figure 5:
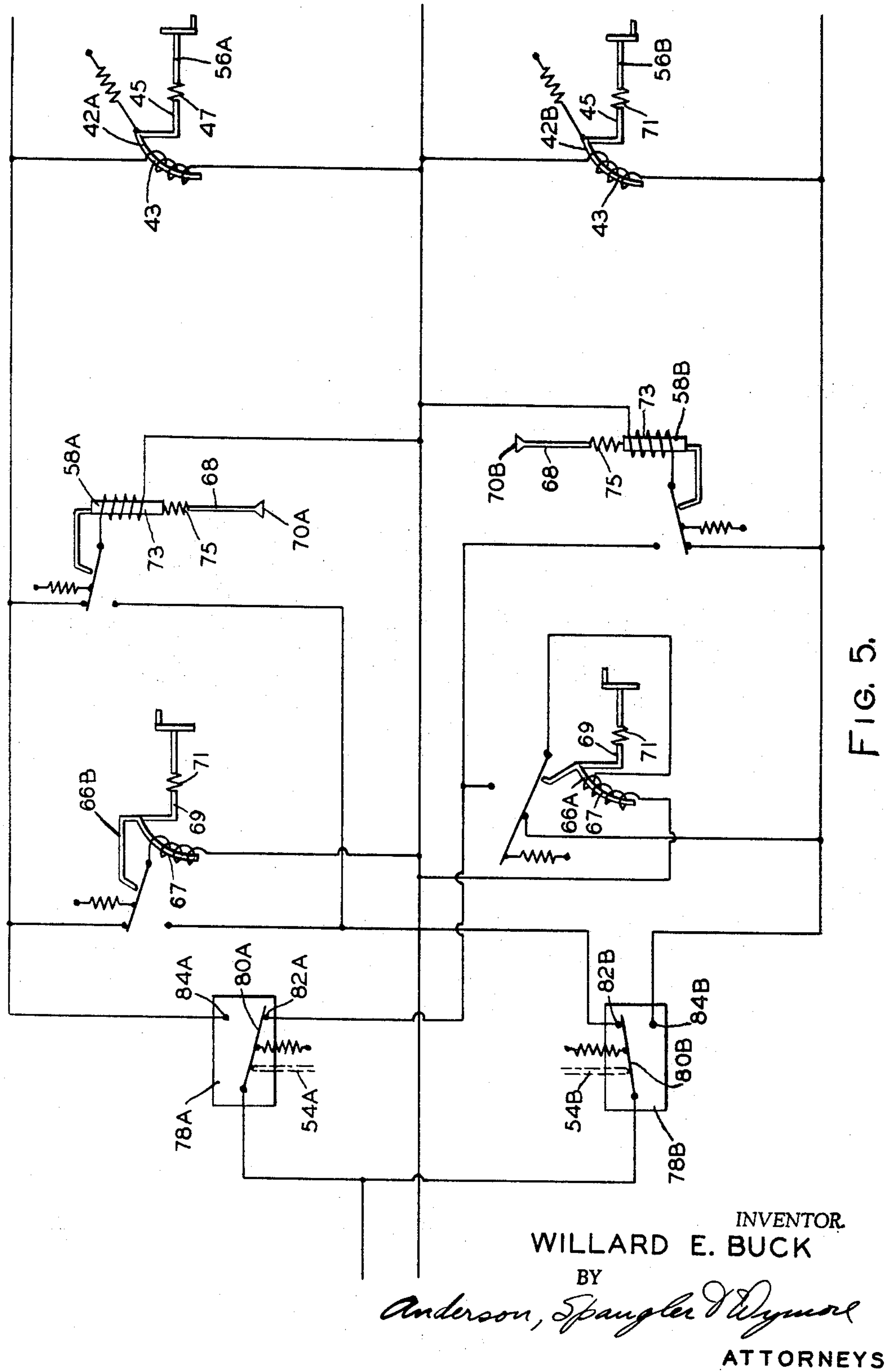
FIGURE 5 is a schematic wiring diagram showing the automatic control circuit for the system.

Referring now to FIGURE 5, it would, perhaps, be well to explain the electrical system which automatically controls the valves and, in addition, some details concerning these various valves. At the beginning of the automatic cycle, the switches 78A and 78B occupy the full line positions shown in FIGURE 5, their actuators 80A and 80B being in engagement with their respective normally-closed contacts 82A and 82B, respectively.

Each of the valves in the system is adapted by means (not shown) for indepedent manual actuation apart from the automatic cycling system, with the exception of valves 20 and 62 which are simple check valves. Manual actuation is used to prime and pressurize the system as well as introduce the initial charge of reactants into chambers A and B. Thus, at the time the system is ready to be switched over to automatic operation, both pistons 74A and 74B are fully extended and chambers A and B are filled with reactants.

Valves 20A and 20B are simple check valves that open under the priming pressure of 500 p.s.i. and remain closed except when reactants are entering the system during the return stroke of the pumps 18A and 18B. Valves 42, 66 and 70 are normally-closed with valves 42 acting as check valves when deenergized. In addition, valve pairs 66 and 70 are of the type employing holding relays or some similar type of electrical lock-in circuity that will keep their solenoids activated so long as said lock-in circuit is energized, even though the circuit that is initially closed to actuate the valve-opening solenoid coil is no longer closed. Switches 78A and 78B have their actuators 80A and 80B normally biased toward normally-closed contacts 82A and 82B.

Valve pairs 42, 66 and 70 are all solenoid-operated check valves. Valves 42 and 66 will pass fluid in one direction whether energized or not. The latter valves will not unseat, however, until the pressure across the valve approaches zero or is reversed. While chambers A and B are being filled with reactants, valves 42 remain deenergized but open due to the positive differential pressure impressed on the pump side thereof. Thus, the only time these valves 42 need be energized into open position is when reverse flow is permitted from chambers A and B back into the piston pumps 18 as will be explained in detail presently.

Schematically in FIGURE 5, it will be noted that the shifting cores 43 and 67 of the solenoid valves 42 and 66 are of the arcuate type that impart rotary motion to the actuating crank arms 45 and 69. While no actuators have been shown in FIGURE 4 to operate valves 66A and 66B, they are the same type shown in FIGURE 2 as actuators for valves 42A and 42B. These actuating crank arms 45 and 69, however, comprise two separate rotating sections interconnected by torsion springs 47 and 71, respectively. Thus, when the valves 42 and 66 are energized to shift the cores 43 and 67 thereof, actuators 45 and 69 only operate to open the valves when the pressure across said valves tending to hold them closed is less than the torsional bias imparted thereto by springs 47 and 71.

Valves 70 are of the more common reciprocating type rather than the rotary. They function as check valves and prevent discharge of the reaction products from chambers A and B into the receiver except when energized. These valves, however, will operate against the 500 p.s.i. priming pressure when energized. Solenoid cores 73 of valves 70 are connected to the push-rods 68 by compression springs 75 (FIGURE 5) that, upon energization of the solenoids, will open the valves when the presusre differential tending to hold them closed is 500 p.s.i. or less. Note, however, that the push-rods are not biased into open position by springs 75 until the solenoids are energized.

With the system in condition to commence automatic operation, the valve pairs 42, 66 and 70 are connected into the electrical system shown in FIGURE 5 that is controlled by switches 78A and 78B, all of these valves being closed. The automatic cycling is initiated by manually opening valve 66A which lets the high pressure into chamber A ahead of piston 74A. The differential pressure on both sides of this piston due to the surface area taken up by rod 54A drives said piston into retracted position, thus moving the reactant charge carried in chamber A past check valve 62A into the reactor 60 where the reaction takes place.

As piston 74A nears the end of its stroke, its piston rod 54A trips switch 78A moving the actuator 80A thereof onto normally-open contact 84A. When this occurs, the solenoids of valves 42A, 66B and 70A are energized but valves 66B and 70A do not respond by opening until the pressure tending to hold them closed falls below that at which their respective springs 71 can bias them into open position. Valve 42A, on the other hand, can open as soon as its solenoid is energized because the fluid pressure on the pump side thereof will equal that in chamber A as soon as the piston 36 of pump 18A nears the end of its compression stroke. When valve 42A opens, it allows the reactants remaining in chamber A to expand back through line 38A to piston pump 18A where it drives the pistons and imparts rotational energy to the flywheel. This action is almost instantaneous as switch 78A remains on contact 84A only momentarily, i.e., while piston rod 54A is fully retracted.

Now, the instant switch 78A is tripped, the lock-in circuits of valves 66B and 70A are energized through the normally-closed contact 82B of switch 78B. Thus, the latter valves are energized, ready to open as soon as the pressure holding them closed falls below the biasing force exerted by their springs, and this is true even after piston rod 54A has moved away from actuator 80A and allowed 78A to return to its normally-closed contact 82A.

Valve 66A, which was opened manually to initiate the automatic cycle, allows reaction products to escape from the reactor outlet at the system pressure of 100,000 p.s.i. into chamber A in order to retract piston 74A. As soon as switch 78A is tripped and valve 42A opens to release the pressure in chamber A back into the piston pump 18A, the pressure on the reaction products in the other end of chamber A falls instantly to the priming pressure of 500 p.s.i. causing piston 74A to retract a bit further. When chamber A drops back to priming pressure due to valve 42A opening and returning energy to the flywheel, valve 66A closes instantly holding the system pressure in the reactor along with valve 62A and valve 70A, whose solenoid has already been energized, opens because the bias exerted by spring 75A is sufficient to overcome the priming pressure. With 70A open, the pressure in chamber A ahead of piston 74A drops to atmospheric permitting the priming pressure of 500 p.s.i. to hold 42A open while the next charge of reactants is fed into chamber A that once again extends the piston 74A and discharges the reaction products into receiver 11.

In the meantime valve 66B, which was actuated by piston rod 54A reaching fully retracted position, has opened admitting reaction products at full system pressure into camber B retracting piston 74B due to the area differential on the open faces of said piston. When piston rod 54B reaches actuator 80B of switch 78B and moves it off of its normally-closed contact 82B, the holding circuit on valve 70A is deenergized allowing the latter to resume its normally closed position where it traps a small quantity of the reaction products between it and piston 74A that are quickly compressed to the system pressure of 100,000 p.s.i. by pump 18A while the latter is pressurizing the new reactant charge in chamber A. The reactants that have already passed check valve 62A into the reactor are already up to almost full system pressure of 100,000 p.s.i. except for the small loss in pressure due to the greater volume of reaction products that can enter chamber A ahead of piston 74A than occupied by the reactant charge behind it. This small loss in system pressure in the reactor is quickly supplied by the pumps 18.

With valve 66A released to its normally-closed position, none of the reaction products can enter chamber A from the reactor. Furthermore, with valve 66A released to closed position and valve 42A still closed, i.e., prior to actuation of switch 78A, there is very little loss of system pressure in chamber A. The only drop in pressure is brought about due to the slightly greater volume of fluid introduced ahead of piston 74A than is present behind it because of the volume displaced by piston rod 54A. This slight reduction in volume and attendant loss in pressure is returned to the system by the high pressure piston-pumps 18.

Note also that the volume of reactor 60 will normally be a great deal larger than that of chambers A and B. This means, of course, that many charges of reactants from chambers A and B must be fed into the reactor before any of the reaction products issue from the outlet end thereof.

As already mentioned, the solenoid valve 66B is energized when switch actuator 80A moves onto its normally-open contact 84A and this valve opens when pressure in chamber B is brought up to system pressure by high pressure pump 18B. This valve 66B is held open by its electrical lock-in circuit connected to normally-closed contact 82B of switch 78B. The reaction products which have reacted in the reactor 60, therefore, move into chamber B causing piston 74B to retract forcing the second charge of reactants into the reactor past check valve 62B. At the same time, chamber A is, once again, filling with the third charge of reactants. Now, when piston rod 54B contacts the actuator 80B of switch 78B and moves the former onto normally-open contact 84B, the lock-in circuits for valves 66B and 70A are deenergized allowing these valves to return to normally-closed position, thus sealing off the low pressure side of chamber A. Once the reactor has been filled, reaction products entering chamber A start the operating cycle over again. As soon as piston rod 54B trips actuator 80B of switch 78B to open valve 42B thereby expanding the reactants in chamber B back to pump 18B and dropping the pressure in chamber B so that 70B can open, valve 66B closes and piston 74B sweeps the reaction products out through line 72B into the receiver. The same, of course, occurs when 66A is closed and 70A is open.

During the automatic cycling of the system the reactor 60 is never open to the low pressure in the receiver and, conversely, when chambers A and B are open to the receiver, they are closed upstream by one of the valves 66 which holds the high pressure between it and the check valves 62. Thus, the pumps 18A and 18B need only replace the incremental energy losses resulting from the energy absorbed by the reaction and the compressibility of the fluid reactants in the reactor. Part of the energy lost through compressibility of the fluids is replaced in the inertia of the flywheel 30 as the expansion from the system pressure of 100,000 p.s.i. in chambers A and B returns energy to the rotating system. In other words, while chamber B is filling with a new charge of reactants and piston 74B is pushing the reaction products into the receiver, inlet valve 42A leading into chamber A is energized into open position permitting the system pressure to expand back into piston pump cylinder 22A thereby returning energy to the flywheel as pistons 24A and 36A retract. Although pistons 74 continue to operate while their connecting chambers are being charged with the reactants, essentially the only energy required is that necessary to overcome friction because, with valve 42 open behind the piston and valves 70 open ahead thereof, both sides of the piston are being subjected to little more than the priming pressure of 500 p.s.i.

Another significant aspect of the system is the tremendous saving in mechanical energy required. For example, in a continuous chemical reactor designed to handle 25 gal./min. at 100,000 p.s.i., it can be shown that such a system will require a pump capable of delivering 2,500 horsepower or thereabouts if it must handle the entire volume. In the same capacity plant, however, calculations reveal that less than twenty percent of this total energy or about 450 horsepower is required to accomplish the same end when the above-described system is used because the pumps need only replace the energy losses in the system.

Note also, that all the high pressure valves of the system operate at small differential pressures. This fact, of course, makes it possible to utilize existing solenoid valve designs that are not particularly expensive. This same small differential pressure exists on opposite sides of the pistons 74 whether they are extending or retracting. Valves 70 operate against the 500 p.s.i. priming pressure while all the others operate under a much smaller differential. Rods 54 which provide the differential pumping pressure can be of small diameter because they are always in tension due to the differential pressure that always exists across stuffing boxes 52 which tends to push the rods out into the atmospheric pressure side in both directions of piston travel.

In the above-described system, one of the major power losses is that occasioned by the compressibility of the fluid reactants during the reaction, this loss being estimated at about 20%. The single-stage system shown can probably only recover about 50% of this loss by using the energy of the expanding reaction products to pressurize the raw materials. The net is believed to be about 10% of the straight-through power requirements. It should be mentioned, therefore, that a considerably greater percentage of this energy consumed in compressing the reactants can probably be recovered by means of a multiple-stage pumping cycle, the benefits of the latter over a single-stage system being well known in the art.

It is pointed out and emphasized that, while the foregoing apparatus is particularly adaptable to the Diels-Alder adduction as set forth in the application, other liquid chemical reactions may also be employed in the applicant's apparatus.

Accordingly, having thus described the several useful and novel features of the above high pressure system, it will be apparent that the many worthwhile objectives for which it was developed have been achieved. Although but a single specific form of the invention has been illustrated and described in detail herein, I realize that certain changes and modifications therein may well occur to those skilled in the art within the broad teaching hereof; hence, it is my intention that the scope of protection afforded hereby shall be limited only insofar as said limitations are expressly set forth in the appended claims.

I claim:

1. The high pressure system for carrying out chemical reactions between fluid reactants which comprises: a high pressure reactor having an inlet and an outlet; first and second cylinders each having one end connected to the reactor inlet and the opposite end to its outlet; first and second pistons mounted respectively in the first and second cylinders for reciprocal movement and dividing the interior thereof into a reactant compartment and a reaction product compartment of variable volume; a piston rod connected to the reactant compartment side of each piston; means connectable to a source of reactants and connected into the reactant compartments of both cylinders adapted to deliver a charge of reactants thereto; receiver means connected into the reaction products therefrom; a first reciprocating pump connected into the reactant compartment of the first cylinder and adapted to compress a charge of reactants placed therein; a second reciprocating pump operating 180° out-of-phase to said first pump connected into the reactant compartment of the second cylinder and adapted to compress a charge of reactants placed therein; flywheel means operatively connected to both pumps and adapted to reciprocate same in alternating relation by means of the rotational energy stored therein; drive means operatively connected to the flywheel means and adapted to rotate same; valve means connected between the pumps and cylinders for controlling the flow of reactants therebetween, said valve means including a first valve adapted to open automatically to permit the flow of reactants from the first pump into the reactant compartment of the first cylinder whenever a positive differential pressure exists on the pump side thereof, said first valve being responsive to movement of the first piston into retracted position and adapted upon actuation to open allowing the reactants compressed in the reactant compartment of the first cylinder to expand back against the first pump, and a second valve adapted to open automatically to permit the flow of reactants from the second pump into the reactant compartment of the second cylinder to expand back against the second pump; check valve means connected between the reactant compartments of each cylinder and the reactor adapted to prevent return flow of reactants to the source thereof; valve means connected between the outlet of the reactor and the reaction product compartments of both cylinders for controlling the flow of reaction products into the latter, said valve means including a third valve responsive to retraction of the second piston adapted upon actuation to open allowing the reaction products to enter the reaction product compartment of the first cylinder retracting the first piston and moving the reactants in the first cylinder reactant compartment into the reactor when the pressure in said first cylinder reaction product compartment rises to a predetermined level, and a fourth valve responsive to retraction of the first piston adapted upon actuation to open allowing the reaction products to enter the reaction product compartment of the second cylinder retracting the second piston and moving the reactants in the second cylinder reactant compartment into the reactor when the pressure in said second cylinder reaction product compartment rises to a predetermined level; valve means connected between the receiver means and the reaction product compartments of both cylinders for controlling the discharge of reaction products into said receiver means, said valve means including a fifth valve responsive to movement of the first piston into retracted position adapted upon actuation to open allowing the reaction products in the first cylinder reaction product compartment to pass into the receiver means when the pressure in said first cylinder reaction product compartment falls to a predetermined level, and a sixth valve responsive to movement of the second piston into retracted position adapted upon actuation to open allowing the reaction products to pass into the receiver means when the pressure in said second cylinder reaction product compartment falls to a predetermined level; first actuating means connected between the first piston and the first, fourth, and fifth valves, said actuating means being operative upon movement of said first piston into retracted position to actuate said valves toward open position; second actuating means connected between the second piston and the second, third and sixth valves, said actuating means being operative upon movement of said second piston into retracted position to actuate said valves toward open position; first holding means connected between the second actuating means and the fourth and fifth valves, said second actuating means being operatively connected to the first actuating means and responsive to actuation of the latter to energize said first holding means to maintain said fourth and fifth valves actuated until the pressure in their respective reaction product compartments reaches the predetermined level at which they open; and, second holding means connected between the first actuating means and the third and sixth valves, said first actuating means being operatively connected to the second holding means and responsive to actuation of the latter to energize said second holding means to maintain said third and sixth valves actuated until the pressure in their respective reaction product compartments reaches the predetermined level at which they open.

2. The high pressure system as set forth in claim 1 which includes check valve means connected between the means feeding reactants into the cylinders and the reactant compartments of said cylinders operative to prevent return flow of reactants to the source thereof.

3. The high pressure system as set forth in claim 1 that includes a check valve located between the reactor inlet and the reactant compartment of each cylinder adapted to prevent back-flow into said reactant compartments.

4. The high pressure system as set forth in claim 1 in which the first through sixth valves are normally closed.

5. The high pressure system as set forth in claim 1 in which: the first through sixth valves are of the normally-closed solenoid types; the first actuating means includes a first normally-open switch operated by the piston rod of the first piston and electrically connected to energize the solenoids of the first, fourth and fifth valves when said switch is moved to closed position; and the second actuating means includes a second normally-open switch operated by the piston rod of the second piston and electrically connected to energize the solenoids of the second, third and sixth valves when said switch is moved to closed position.

6. The high pressure system as set forth in claim 1 in which each of the first through sixth valves are normally-closed, and in which each of said valves includes spring means operative to delay opening thereof when actuated until the differential pressure acting in a direction to hold said valve closed falls to a predetermined minimum.

7. The high pressure system as set forth in claim 5 in which: the first holding means comprises an electrical circuit connected to energize the solenoids of the first, fourth and fifth valves through the second switch when the latter is open once said solenoids have been momentarily energized by closure of the first switch; and the second holding means comprises an electrical circuit connected to energize the soelnoids of the second, third and sixth valves through the first switch when the latter is open once said solenoids have been momentarily energized by closure of said second switch.

8. The system as set forth in claim 5 which includes check valve means connected between the means feeding reactants into the cylinders and the reactant compartments of said cylinders operative to prevent return flow of reactants to the source thereof.

References Cited

UNITED STATES PATENTS

| | | | |
|---|---|---|---|
| 2,814,551 | 11/1957 | Broeze et al. | 23—252 |
| 3,177,245 | 4/1965 | Cheifetz et al. | 260—515 |

JAMES H. TAYMAN, Jr., *Primary Examiner.*